US011133751B2

(12) United States Patent
Liu et al.

(10) Patent No.: US 11,133,751 B2
(45) Date of Patent: Sep. 28, 2021

(54) APPARATUS, INVERTER SYSTEM, AND METHOD FOR SYNCHRONIZING CARRIERS

(71) Applicant: HUAWEI TECHNOLOGIES CO., LTD., Guangdong (CN)

(72) Inventors: Fangcheng Liu, Shanghai (CN); Xiongfei Wang, Aalborg (DK); Kai Xin, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 53 days.

(21) Appl. No.: 16/692,600

(22) Filed: Nov. 22, 2019

(65) Prior Publication Data

US 2020/0127580 A1 Apr. 23, 2020

Related U.S. Application Data

(63) Continuation of application No. PCT/CN2017/085805, filed on May 25, 2017.

(51) Int. Cl.
*H02M 7/23* (2006.01)
*H02M 1/12* (2006.01)
(Continued)

(52) U.S. Cl.
CPC ............... *H02M 7/23* (2013.01); *H02M 1/12* (2013.01); *H02M 5/458* (2013.01); *H02M 7/49* (2013.01)

(58) Field of Classification Search
None
See application file for complete search history.

(56) References Cited

U.S. PATENT DOCUMENTS 9,083,189 B2 7/2015 Wang
2010/0110743 A1 5/2010 Yamasaki
(Continued)

FOREIGN PATENT DOCUMENTS

CN 201122906 Y 9/2008
CN 101647187 A 2/2010
(Continued)

OTHER PUBLICATIONS

China Energy Storage Network News, "List of global household energy storage products" Energy Storage Alliance, Published, Nov. 17, 2016, 8 pages.
(Continued)

*Primary Examiner* — Jeffrey A Gblende
(74) *Attorney, Agent, or Firm* — Fish & Richardson P.C.

(57) ABSTRACT

This application discloses an apparatus, an inverter system, and a method for synchronizing carriers. The apparatus includes a modulation unit, a current processing unit, and a control unit. The control unit can adjust, based on a change trend between an amplitude of a first harmonic current and an amplitude of a second harmonic current and a change trend between a phase of a first carrier and a phase of a second carrier, a phase of an input carrier input into the modulation unit, to decrease an amplitude of a harmonic current output by an inverter and improve stability of a distributed power supply system. Further, a prior-art problem that impact of a harmonic current on a power supply system cannot be reduced by synchronizing carriers in a process of synchronizing carriers based on a zero sequence current is avoided, thereby improving the stability of the distributed power supply system.

14 Claims, 7 Drawing Sheets

(51) Int. Cl.
*H02M 5/458* (2006.01)
*H02M 7/49* (2007.01)

(56) References Cited

U.S. PATENT DOCUMENTS

| | | | | |
|---|---|---|---|---|
| 2013/0278194 | A1* | 10/2013 | Numakura | B60L 3/003 318/400.27 |
| 2014/0049152 | A1* | 2/2014 | Baldwin | H01J 21/20 313/306 |
| 2015/0015171 | A1* | 1/2015 | Nishibata | H02P 29/50 318/400.15 |
| 2017/0222583 | A1* | 8/2017 | Akimatsu | H02P 6/16 |

FOREIGN PATENT DOCUMENTS

| | | |
|---|---|---|
| CN | 104486059 A | 4/2015 |
| CN | 104901333 A | 9/2015 |
| CN | 104950765 A | 9/2015 |
| CN | 104967351 A | 10/2015 |
| CN | 105703651 A | 6/2016 |
| CN | 105978554 A | 9/2016 |
| CN | 106341050 A | 1/2017 |
| JP | 2016005380 A | 1/2016 |

OTHER PUBLICATIONS

Powerwall, "The Tesla Home Battery" retrieved from the internet <https://www.tesla.cn/powerwall?redirect=no>, Feb. 5, 2020, 5 pages.
Yu et al., "Modeling and Resonance Analysis of Multi-parallel Inverters System under Asynchronous Carriers Conditions" IEEE Transactions on Power Electronics, vol. 32, No. 4, Apr. 2017, 14 pages.
PCT International Search Report and Written Opinion in International Application No. PCT/CN2017/085,805, dated Feb. 26, 2018, 15 pages (With English Translation).
Extended European Search Report issued in European Application No. 17910657.0 dated Apr. 24, 2020, 8 pages.
Liu et al., "Study on restraint of circulating current in parallel inverters system with SPWM modulation by adjusting phases of triangular carrier waves," 2013 2nd International Symposium on Instrumentation and Measurement, Sensor Network and Automation (IMSNA), IEEE, XP032570778, Dec. 23, 2013, pp. 477-480.
Office Action issued in Chinese Application No. 201780091155.2 dated May 6, 2020, 9 pages (with English translation).

* cited by examiner

```
┌─────────────────────────────────────────────────────────────┐
│  Obtain an amplitude of a first harmonic current output by the inverter
│  and an amplitude of a second harmonic current output by the inverter,
│  where the first harmonic current is a harmonic current output by the
│  inverter when the input carrier is a first carrier that is input into the      810
│  modulation unit and used with the modulated wave to generate a
│  switch signal to control a switch device in the inverter, the second
│  harmonic current is a harmonic current output by the inverter when the
│  input carrier is a second carrier that is input into the modulation unit
│  and used with the modulated wave to generate a switch signal to
│  control the inverter, and a phase of the first carrier is different from a
│  phase of the second carrier
└─────────────────────────────────────────────────────────────┘
                                │
┌─────────────────────────────────────────────────────────────┐
│  Increase or decrease, based on a first change trend and a second
│  change trend, a phase of an input carrier input into the modulation
│  unit, so that an amplitude of a third harmonic current output by the
│  inverter is less than a smaller value in the amplitude of the first
│  harmonic current and the amplitude of the second harmonic current,             820
│  where the first change trend is a change trend between the amplitude
│  of the first harmonic current and the amplitude of the second harmonic
│  current, the second change trend is a change trend between the phase
│  of the first carrier and the phase of the second carrier, and the third
│  harmonic current is a harmonic current output by the inverter when a
│  carrier input into the modulation unit is an input carrier whose phase is
│  increased or decreased and the input carrier whose phase is increased
│  or decreased is used with the modulated wave to generate a switch
│  signal to control the switch device in the inverter
└─────────────────────────────────────────────────────────────┘
```

FIG. 8

APPARATUS, INVERTER SYSTEM, AND METHOD FOR SYNCHRONIZING CARRIERS

CROSS-REFERENCE TO RELATED APPLICATION

This application is a continuation of International Application No. PCT/CN2017/085805, filed on May 25, 2017, the disclosure of which is hereby incorporated by reference in its entirety.

TECHNICAL FIELD

This application relates to the field of power supply technologies, and more specifically, to an apparatus, an inverter system, and a method for synchronizing carriers.

BACKGROUND

As a power supply capacity of a power supply system continuously increases, an inverter capacity and a quantity of inverters required by the power supply system are also increasing. In a large power supply system, a plurality of inverters are usually used in parallel to improve a power supply capacity of the power supply system. If carriers of the parallel inverters in the power supply system are not synchronized, a cross current and a harmonic current may be generated, and consequently, quality of electric energy output by the inverter is jeopardized, and even stability of the power supply system is endangered. Therefore, carrier synchronization is one of basic requirements for stable operation of the power supply system.

A current method for synchronizing carriers is mainly applied to a power supply system that includes a plurality of parallel inverters connected by using a communications cable (for example, a bus). In other words, the plurality of parallel inverters are connected by using the communications cable, and the plurality of parallel inverters synchronize carriers by using a carrier synchronization signal sent through the connected communications cable. However, in such a connection manner in which the plurality of parallel inverters need to be connected by using the communications cable, field cabling is complicated and difficult to implement, and particularly, when the communications cable is faulty or interfered with, a function of carrier synchronization between the inverters cannot be implemented.

The power supply system including the parallel inverters based on the communications cable has difficulty in synchronizing carriers, and therefore, increasing attention is paid to a power supply system including parallel inverters using no communications cable. However, a method for synchronizing carriers that is currently applied to the power supply system including parallel inverters using no communications cable is specific to a centralized three-phase power supply system. It can be learned from a schematic block diagram of a centralized three-phase power supply system 100 shown in FIG. 1 that, in the centralized three-phase power supply system, direct current input ends of parallel three-phase inverters are all connected to a same direct current bus. In such a manner in Which the inverters are connected in parallel, a zero sequence cross current between adjacent inverters has relatively great impact on stability of the power supply system. Therefore, in the centralized three-phase power supply system, phases of carriers output by the inverters are adjusted based on the zero sequence cross current generated between the parallel inverters, to synchronize carriers.

However, in a distributed power supply system, a distance between adjacent inverters in inverters is usually set to be relatively great, and direct current input ends of the inverters are independent of each other. In such a manner in which the inverters are connected in parallel, a zero sequence cross current has relatively small impact on stability of the distributed power supply system, and a system harmonic current is a main factor that affects the stability of the distributed power supply system. Therefore, if the foregoing method for synchronizing carriers in the centralized three-phase power supply system is still used, the stability of the distributed power supply system cannot be effectively improved.

SUMMARY

Embodiments of this application provide an apparatus, an inverter system, and a method for synchronizing carriers, to improve stability of a distributed power supply system.

According to a first aspect, an apparatus for synchronizing carriers is provided, including: a modulation unit, configured to generate a switch signal based on an input carrier and a modulated wave, to control a switch device in an inverter; a current processing unit, configured to obtain an amplitude of a first harmonic current output by the inverter and an amplitude of a second harmonic current output by the inverter, where the first harmonic current is a harmonic current output by the inverter when the input carrier is input into the modulation unit as a first carrier and used with the modulated wave to generate a switch signal to control the switch device in the inverter, the second harmonic current is a harmonic current output by the inverter when the input carrier is input into the modulation unit as a second carrier and used with the modulated wave to generate a switch signal to control the inverter, and a phase of the first carrier is different from a phase of the second carrier; and a control unit, configured to increase or decrease, based on a first change trend and a second change trend, a phase of an input carrier input into the modulation unit, so that an amplitude of a third harmonic current output by the inverter is less than a smaller value in the amplitude of the first harmonic current and the amplitude of the second harmonic current, where the first change trend is a change trend between the amplitude of the first harmonic current and the amplitude of the second harmonic current, the second change trend is a change trend between the phase of the first carrier and the phase of the second carrier, and the third harmonic current is a harmonic current output by the inverter when a carrier input into the modulation unit is an input carrier whose phase is adjusted and the input carrier whose phase is adjusted is used with the modulated wave to generate a switch signal to control the switch device in the inverter.

In this embodiment of this application, based on the change trend between the amplitude of the first harmonic current and the amplitude of the second harmonic current and the change trend between the phase of the first carrier and the phase of the second carrier, the phase of the input carrier input into the modulation unit is adjusted, to decrease an amplitude of a harmonic current output by the inverter and improve stability of a distributed power supply system.

Further, a prior-art problem that impact of a harmonic current on a power supply system cannot be reduced by synchronizing carriers in a process of synchronizing carriers based on a zero sequence current is avoided, thereby improving the stability of the distributed power supply system.

With reference to the first aspect, in some implementations of the first aspect, the control unit is configured to: when the first change trend is the same as the second change trend, decrease the phase of the input carrier input into the modulation unit, and when the first change trend is contrary to the second change trend, increase the phase of the input carrier input into the modulation unit.

The phase of the input carrier input into the modulation unit is increased or decreased based on the first change trend and the second change trend, without a need to store a mapping relationship between the first change trend and the second change trend in a controller in advance, thereby reducing a storage requirement for the controller.

In some implementations, the first change trend is denoted as $i_1-i_2$, where $i_1$ represents the amplitude of the first harmonic current, and $i_2$ represents an amplitude of a second harmonic current. The second change trend is denoted as $\theta_1-\theta_2$, where $\theta_1$ represents the phase of the first carrier, and $\theta_2$ represents the phase of the second carrier.

In some implementations, that the first change trend is the same as the second change trend may mean that the first change trend and the second change trend are both positive numbers or both negative numbers, in other words, $$\frac{i_1 - i_2}{\theta_1 - \theta_2} > 0.$$

That the first change trend is contrary to the second change trend may mean that the first change trend and the second change trend are not both positive numbers or negative numbers, in other words, $$\frac{i_1 - i_2}{\theta_1 - \theta_2} < 0.$$

With reference to the first aspect, in some implementations of the first aspect, the control unit is further configured to: determine an adjustment step, where the adjustment step is an adjustment step of increasing or decreasing the phase of the input carrier; and increase or decrease, according to the adjustment step and based on the first change trend and the second change trend, the phase of the input carrier input into the modulation unit.

With reference to the first aspect, in some implementations of the first aspect, the first harmonic current is a harmonic current that is currently output by the inverter; and the control unit is further configured to determine the adjustment step according to a formula $$\Delta\theta = \begin{cases} \theta_{ref}, & (i_f \geq 20\% \cdot i_N) \\ 0.5 \cdot \theta_{ref}, & (i_N > i_f \geq 10\% \cdot i_N), \\ 0.25 \cdot \theta_{ref}, & (10\% \cdot i_N > i_f) \end{cases}$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

The adjustment step is set segment by segment, to adjust the phase of the input carrier, and this helps improve adjustment efficiency of the phase of the input carrier.

With reference to the first aspect, in some implementations of the first aspect, the first harmonic current is a harmonic current that is currently output by the inverter; and the control unit is further configured to determine the adjustment step according to a formula $$\Delta\theta = \frac{i_f}{i_N}\theta_{ref},$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents an reference value for determining the adjustment step.

The adjustment step is set so that the adjustment step can change with the amplitude of the first harmonic current, to adjust the phase of the input carrier. This helps improve adjustment efficiency of the phase of the input carrier.

In some embodiments, increasing the phase of the input carrier input into the modulation unit may mean delaying the input carrier for a time period corresponding to a time adjustment value in terms of time, and decreasing the phase of the input carrier input into the modulation unit may mean advancing the input carrier by a time period corresponding to a time adjustment value in terms of time.

In some embodiments, if a unit of the adjustment step $\Delta\theta$ is a degree, a time adjustment value $\Delta t$ may be obtained according to a formula $$\Delta t = \frac{\Delta\theta}{360° f_c},$$

where $\Delta\theta$ represents the adjustment step, and $f_c$ represents a frequency of an input carrier.

In some embodiments, if a unit of the adjustment step $\Delta\theta$ is a radian (rad), a time adjustment value $\Delta t$ may be obtained according to a formula $$\Delta t = \frac{\Delta\theta}{2\pi f_c}$$

where $\Delta\theta$ represents the adjustment step, and $f_c$ represents a frequency of an input carrier.

With reference to the first aspect, in some implementations of the first aspect, the control unit is further configured to increase or decrease, based on the first change trend, the second change trend, and a mapping relationship between a change trend of an amplitude of a harmonic current, and a change trend of the phase of the input carrier, the phase of the input carrier input into the modulation unit.

One adjustment is performed, based on a mapping relationship between the first change trend and the second change trend, on the phase of the input carrier input into the modulation unit, so that the amplitude of the third harmonic current output by the inverter is less than the smaller value in the amplitude of the first harmonic current and the amplitude of the second harmonic current, to simplify a phase adjustment process of the input carrier.

In some implementations, the control unit is further specifically configured to increase or decrease, according to a preset adjustment step and based on the first change trend, the second change trend, and a mapping relationship between a change trend of an amplitude of a harmonic current, and a change trend of the phase of the input carrier, the phase of the input carrier input into the modulation unit.

The phase of the input carrier input into the modulation unit is gradually adjusted according to the preset adjustment step and based on a mapping relationship between the first change trend and the second change trend, to refine a phase adjustment process of the input carrier, so that the phase adjustment process of the input carrier is more accurate.

With reference to the first aspect, in some implementations of the first aspect, the control unit includes: a logic determining unit, configured to determine, based on the first change trend and the second change trend, the phase of the input carrier input into the modulation unit; and a phase shift unit, configured to increase or decrease, based on the determined phase of the input carrier input into the modulation unit, the phase of the input carrier input into the modulation unit.

With reference to the first aspect, in some implementations of the first aspect, the inverter is a single-phase inverter or a three-phase inverter.

In some implementations, the current amplitude threshold may be 1% of a rated current of the inverter.

In some embodiments, the current processing unit is further configured to perform current sampling on an alternating current output by the inverter, to obtain an amplitude of a harmonic current output by the inverter.

According to a second aspect, an inverter system is provided, including several inverters, where the inverter system includes the apparatus described in any implementation of the first aspect, and the apparatus is configured to control the several inverters to synchronize carriers.

In this embodiment of this application, based on a change trend between an amplitude of a first harmonic current and an amplitude of a second harmonic current and a change trend between a phase of a first carrier and a phase of a second carrier, a phase of an input carrier input into the modulation unit is adjusted, to decrease an amplitude of a harmonic current output by the inverter and improve stability of a distributed power supply system.

Further, a prior-art problem that impact of a harmonic current on a power supply system cannot be reduced by synchronizing carriers in a process of synchronizing carriers based on a zero sequence current is avoided, thereby improving the stability of the distributed power supply system.

According to a third aspect, a method for synchronizing carriers is provided, where an apparatus to which the method is applied includes a modulation unit and an inverter, the modulation unit is configured to generate a switch signal based on an input carrier and a modulated wave, to control a switch device in the inverter, and the method includes: obtaining an amplitude of a first harmonic current output by the inverter and an amplitude of a second harmonic current output by the inverter, where the first harmonic current is a harmonic current output by the inverter when the input carrier is input into the modulation unit a first carrier and used with the modulated wave to generate a switch signal to control the switch device in the inverter, the second harmonic current is a harmonic current output by the inverter when the input carrier is input into the modulation unit as a second carrier and used with the modulated wave to generate a switch signal to control the switch device in the inverter, and a phase of the first carrier is different from a phase of the second carrier; and increasing or decreasing, based on a first change trend and a second change trend, a phase of an input carrier input into the modulation unit, so that an amplitude of a third harmonic current output by the inverter is less than a smaller value in the amplitude of the first harmonic current and the amplitude of the second harmonic current, where the first change trend is a change trend between the amplitude of the first harmonic current and the amplitude of the second harmonic current, the second change trend is a change trend between the phase of the first carrier and the phase of the second carrier, and the third harmonic current is a harmonic current output by the inverter when a carrier input into the modulation unit is an input carrier whose phase is increased or decreased and the input carrier whose phase is increased or decreased is used with the modulated wave to generate a switch signal to control the switch device in the inverter.

In this embodiment of this application, based on the change trend between the amplitude of the first harmonic current and the amplitude of the second harmonic current and the change trend between the phase of the first carrier and the phase of the second carrier, the phase of the input carrier input into the modulation unit is adjusted, to decrease an amplitude of a harmonic current output by the inverter and improve stability of a distributed power supply system.

Further, a prior-art problem that impact of a harmonic current on a power supply system cannot be reduced by synchronizing carriers in a process of synchronizing carriers based on a zero sequence current is avoided, thereby improving the stability of the distributed power supply system.

With reference to the third aspect, in some implementations of the third aspect, the increasing or decreasing, based on a first change trend and a second change trend, a phase of an input carrier input into the modulation unit includes: when the first change trend is the same as the second change trend, decreasing the phase of the input carrier input into the modulation unit, and when the first change trend is contrary to the second change trend, increasing the phase of the input carrier input into the modulation unit.

The phase of the input carrier input into the modulation unit is increased or decreased based on the first change trend and the second change trend, without a need to store a mapping relationship between the first change trend and the second change trend in a controller in advance, thereby reducing a storage requirement for the controller.

In some implementations, the first change trend is denoted as $i_1-i_2$, where $i_1$ represents the amplitude of the first harmonic current, and $i_2$ represents an amplitude of a second harmonic current. The second change trend is denoted as $\theta_1-\theta_2$, where $\theta_1$ represents the phase of the first carrier, and $\theta_2$ represents the phase of the second carrier.

In some implementations, that the first change trend is the same as the second change trend may mean that the first change trend and the second change trend are both positive numbers or negative numbers, in other words, $$\frac{i_1-i_2}{\theta_1-\theta_2} > 0.$$

That the first change trend is contrary to the second change trend may mean that the first change trend and the second change trend are not both positive numbers or negative numbers, in other words, $$\frac{i_1-i_2}{\theta_1-\theta_2} < 0.$$

With reference to the third aspect, in some implementations of the third aspect, the method further includes: determining an adjustment step, where the adjustment step is an adjustment step of increasing or decreasing the phase of the input carrier; and the increasing or decreasing, based on a first change trend and a second change trend, a phase of an input carrier input into the modulation unit further includes: increasing or decreasing, according to the adjustment step and based on the first change trend and the second change trend, the phase of the input carrier input into the modulation unit.

With reference to the third aspect, in some implementations of the third aspect, the first harmonic current is a harmonic current that is currently output by the inverter; and the determining an adjustment step includes: determining the adjustment step according to a formula $$\Delta\theta = \begin{cases} \theta_{ref}, & (i_f \geq 20\% \cdot i_N) \\ 0.5 \cdot \theta_{ref}, & (i_N > i_f \geq 10\% \cdot i_N), \\ 0.25 \cdot \theta_{ref}, & (10\% \cdot i_N > i_f) \end{cases}$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

harmonic current The adjustment step is set segment by segment, to adjust the phase of the input carrier, and this helps improve adjustment efficiency of the phase of the input carrier With reference to the third aspect, in some implementations of the third aspect, the first harmonic current is a harmonic current that is currently output by the inverter; and the determining an adjustment step includes: determining the adjustment step according to a formula $$\Delta\theta = \frac{i_f}{i_N}\theta_{ref},$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

The adjustment step is set so that the adjustment step can change with the amplitude of the first harmonic current, to adjust the phase of the input carrier. This helps improve adjustment efficiency of the phase of the input carrier.

In some embodiments, increasing the phase of the input carrier input into the modulation unit may mean delaying the input carrier for a time period corresponding to a time adjustment value in terms of time, and decreasing the phase of the input carrier input into the modulation unit may mean advancing the input carrier by a time period corresponding to a time adjustment value in terms of time.

In some embodiments, if a unit of the adjustment step $\Delta\theta$ is a degree, a time adjustment value $\Delta t$ may be obtained according to a formula $$\Delta t = \frac{\Delta\theta}{360°f_c},$$

where $\Delta\theta$ represents the adjustment step, and $f_c$ represents a frequency of an input carrier.

In some embodiments, if a unit of the adjustment step $\Delta\theta$ is a radian (rad), a time adjustment value $\Delta t$ may be obtained according to a formula $$\Delta t = \frac{\Delta\theta}{2\pi f_c}$$

where $\Delta\theta$ represents the adjustment step, and $f_c$ represents a frequency of an input carrier.

With reference to the third aspect, in some implementations of the third aspect, the increasing or decreasing, based on a first change trend and a second change trend, a phase of an input carrier input into the modulation unit further includes: increasing or decreasing, based on the first change trend, the second change trend, and a mapping relationship between a change trend of an amplitude of a harmonic current and a change trend of the phase of the input carrier, the phase of the input carrier input into the modulation unit.

One adjustment is performed, based on a mapping relationship between the change trend of the amplitude of the harmonic current and the change trend of the phase of the input carrier, on the phase of the input carrier input into the modulation unit, so that the amplitude of the third harmonic current output by the inverter is less than the smaller value in the amplitude of the first harmonic current and the amplitude of the second harmonic current, to simplify a phase adjustment process of the input carrier.

With reference to the third aspect, in some implementations of the third aspect, the increasing or decreasing, based on a first change trend and a second change trend, a phase of an input carrier input into the modulation unit further includes: increasing or decreasing, according to a preset adjustment step and based on the first change trend, the second change trend, and a mapping relationship between a change trend of an amplitude of a harmonic current, and a change trend of the phase of the input carrier, the phase of the input carrier input into the modulation unit.

The phase of the input carrier input into the modulation unit is gradually adjusted according to the preset adjustment step and based on a mapping relationship between the change trend of the amplitude of the harmonic current and the change trend of the phase of the input carrier, to refine a phase adjustment process of the input carrier, so that the phase adjustment process of the input carrier is more accurate.

With reference to the third aspect, in some implementations of the third aspect, the adjusting, based on a first change trend and a second change trend, a phase of an input carrier input into the modulation unit includes: determining, based on the first change trend and the second change trend, the phase of the input carrier input into the modulation unit; and increasing or decreasing, based on the determined phase of the input carrier input into the modulation unit, the phase of the input carrier input into the modulation unit.

In some implementations, the current amplitude threshold may be 1% of a rated current of the inverter.

In some embodiments, the method further includes: performing current sampling on an alternating current output by the inverter, to obtain an amplitude of a harmonic current output by the inverter.

With reference to the third aspect, in some implementations of the third aspect, the inverter is a single-phase inverter or a three-phase inverter.

According to a fourth aspect, a computer-readable medium is provided. The computer-readable medium stores program code to be executed by a computing device, and the program code includes an instruction used to perform the method according to the second aspect.

According to a fifth aspect, a computer program product including an instruction is provided. When the instruction runs on a computer, the computer performs the method according to the second aspect.

The technical solutions provided in this application help improve the stability of the distributed power supply system.

BRIEF DESCRIPTION OF DRAWINGS

FIG. 8 is a schematic flowchart of a method for synchronizing carriers according to an embodiment of this application.

DESCRIPTION OF EMBODIMENTS

The following describes technical solutions of this application with reference to accompanying drawings.

For ease of understanding, an application scenario in the embodiments of this application is first briefly described.

Figure 1:
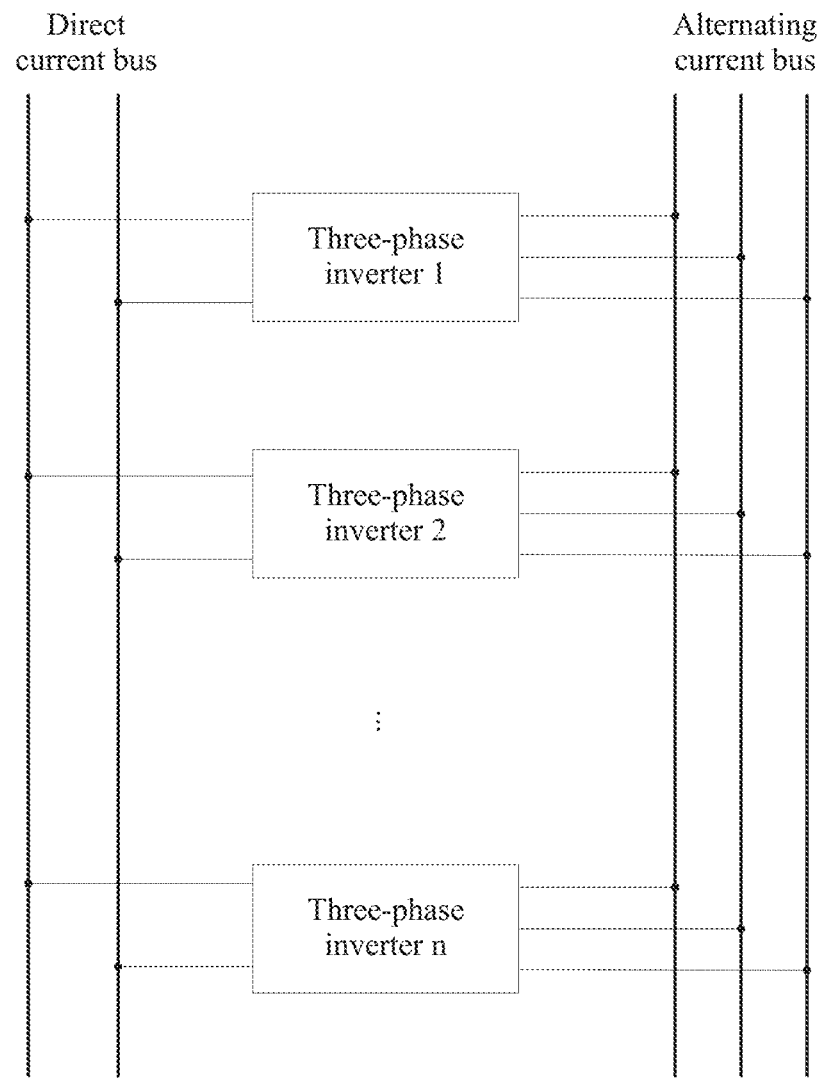
FIG. 1 is a schematic block diagram of a centralized three-phase power supply system 100.
Figure 2:
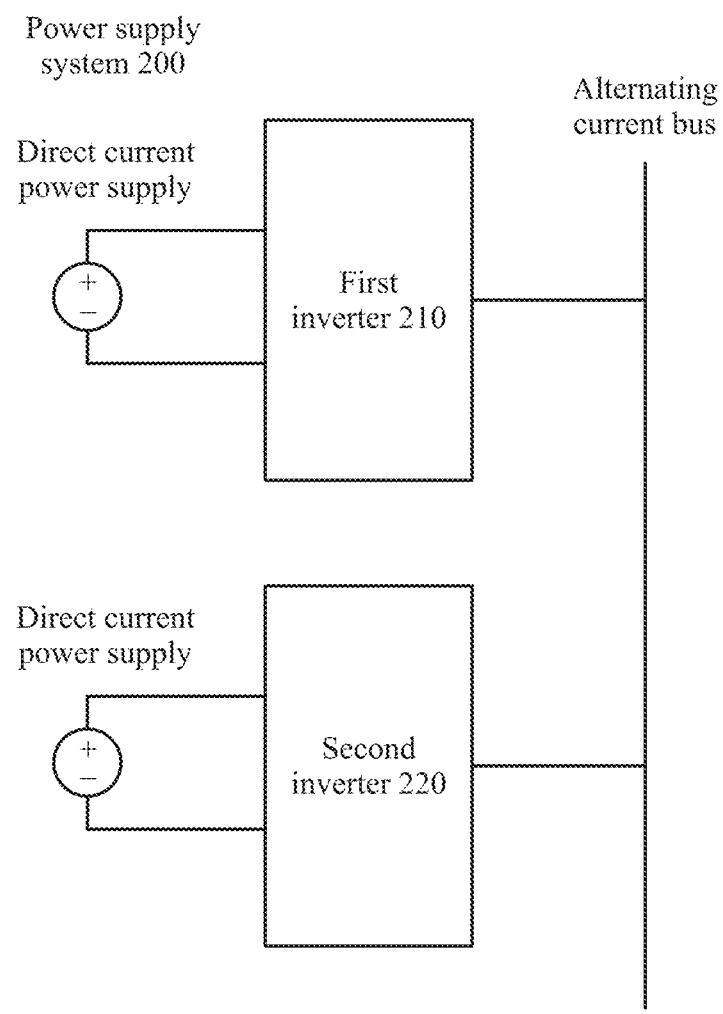
FIG. 2 is a schematic block diagram of a distributed power supply system according to an embodiment of this application.

FIG. 2 is a schematic block diagram of a distributed power supply system according to an embodiment of this application. A distributed power supply system 200 shown in FIG. 2 includes a first inverter 210, a second inverter 220, and an alternating current bus. An output end of the first inverter 210 and an output end of the second inverter 220 are connected to the same alternating current bus. The first inverter and the second inverter can jointly provide an alternating current for a power grid, and a direct current power supply that provides a direct current for the first inverter is independent of a direct current power supply that provides a direct current for the second inverter.

It should be noted that, that the distributed three-phase power supply system shown in FIG. 2 includes two parallel inverters is used only for a description purpose, and a quantity of parallel inverters in the distributed three-phase power supply system is not specifically limited in this embodiment of this application.

In the distributed three-phase power supply system shown in FIG. 2, the inverter may be a single-phase inverter or a three-phase inverter. The following briefly describes a structure of the single-phase inverter with reference to FIG. 3.

Figure 3:
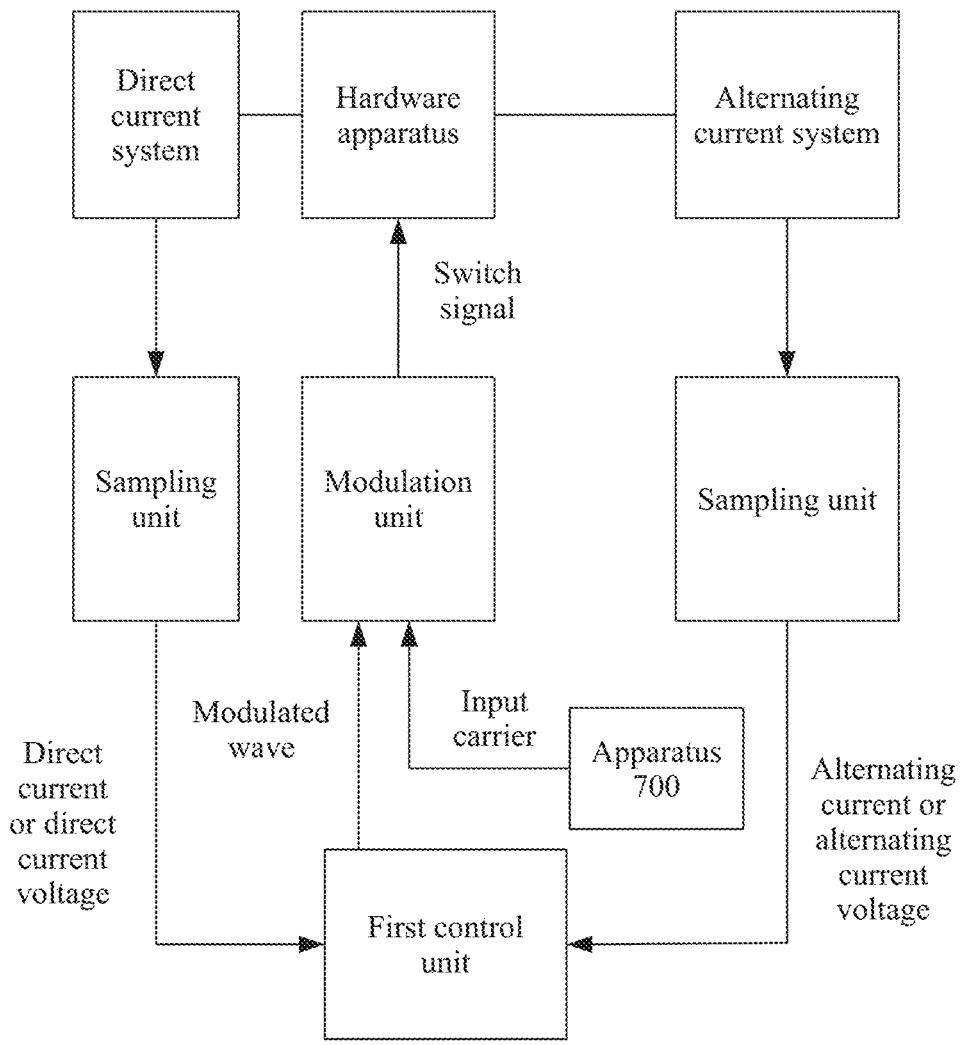
FIG. 3 is a schematic block diagram of a single-phase inverter according to an embodiment of this application.

FIG. 3 is a schematic block diagram of a single-phase inverter according to an embodiment of this application. A single-phase inverter 300 shown in FIG. 3 includes a direct current system, an alternating current system, a hardware apparatus, a first control unit, a sampling unit, and a modulation unit.

A first input end of the direct current system is connected to a first input end of the hardware apparatus, and is configured to provide direct current energy for the hardware apparatus. An output end of the hardware apparatus may be connected to an alternating current bus of a power grid. The hardware apparatus includes an apparatus such as a capacitor, an inductor, a resistor, a semiconductor switch device, or a relay, and is configured to inversely transform, into an alternating current, direct current energy obtained from a direct current bus, and output the alternating current to the alternating current bus. A first input end of the first control unit is connected to the direct current system by using a first sampling unit, a second input end of the first control unit is connected to the output end of the hardware apparatus by using a second sampling unit, and the first control unit is configured to determine a modulated wave based on a direct current voltage or a direct current collected by the first sampling unit from the direct current system and an alternating current voltage or an alternating current collected by the second sampling unit from the alternating current system. An input end of the modulation unit is connected to an output end of the first control unit, and the modulation unit is configured to generate, based on an input carrier input into the modulation unit and the modulated wave output by the first control unit, a switch signal used to drive an on/off state of a switch device in the hardware apparatus.

It should be noted that the modulated wave may be input by the first control unit or a host computer into the modulation unit. A specific source of the modulated wave is not limited in this embodiment of this application.

It should be understood that the alternating current system may be an apparatus or a system that can provide or absorb an alternating current. For example, the alternating current system may be the alternating current bus in the power grid.

It should be further understood that the direct current system may be an apparatus or a system that can provide or absorb direct current energy. For example, the direct current system may be a direct current power supply or direct current load.

However, when a plurality of inverters are connected to the alternating current bus in parallel, a phase of the input carrier input into the modulation unit affects a waveform of a switch signal actually output by the modulation unit. In addition, because the inverters receive different switch signals output by the modulation unit, actual output voltage waveforms of different inverters are different, and a voltage difference between different voltage waveforms affects an equivalent high-frequency voltage source of a system. In addition, when a signal frequency of the equivalent high-frequency voltage source of the system is close to a natural resonance frequency of a hardware apparatus such as an inductor or a capacitor in the inverter, an alternating current output by the inverter includes a harmonic current, and the harmonic current affects quality of electric energy output by a power supply system, and even jeopardizes stability of the power supply system.

To reduce impact of the harmonic current on the quality of the electric energy output by the power supply system and the stability of the power supply system, in this embodiment of this application, an amplitude of the harmonic current output by the inverter is decreased by using a method for synchronizing carriers. In other words, the amplitude of the harmonic current is adjusted based on a change trend between amplitudes of harmonic currents and a change trend between phases of input carriers input into the modulation unit.

With reference to FIG. 2, the following briefly describes a relationship between the amplitude of the harmonic current and the phase of the input carrier input into the modulation unit.

Figure 4:
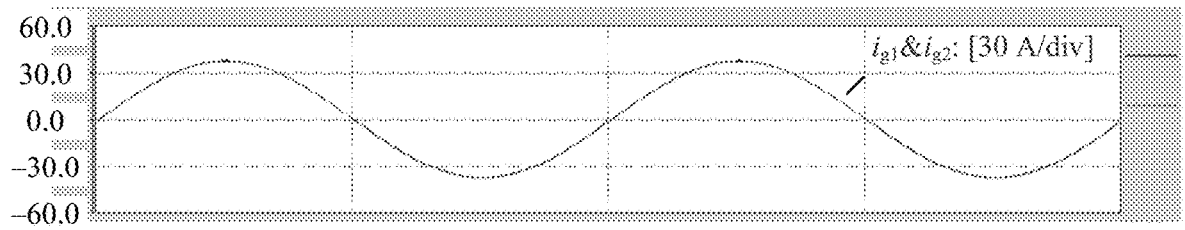
FIG. 4 is a schematic diagram of an output current curve of a first inverter and a second inverter in a power supply system according to an embodiment of this application.

It is found through an experiment that, when carrier synchronization needs to be performed on a second inverter after carrier synchronization is performed on a first inverter, if a phase of an input carrier (referred to as an "input carrier corresponding to the first inverter" below) input into a first modulation unit to control a switch signal of the first inverter is the same as a phase of an input carrier (referred to as an "input carrier corresponding to the second inverter" below) input into a second modulation unit to control a switch signal of the second inverter, in other words, a phase difference is 0, a phase of an output high-frequency voltage waveform of the first inverter is equal to a phase of an output high-frequency voltage waveform of the second inverter, and an amplitude of a harmonic current in an alternating current output by the second inverter is approximately 0. For a specific current curve, refer to FIG. 4. It can be learned from a current curve of an alternating current $i_{g1}$ output by the first inverter and an alternating current $i_{g2}$ output by the second inverter shown in FIG. 4 that a high frequency component (which may be used to represent an amplitude of a harmonic current) in $i_{g1}$ and $i_{g2}$ is relatively small.

If the phase of the input carrier corresponding to the first inverter is contrary to the phase of the input carrier corresponding to the second inverter, in other words, the phase difference is $\pi$, a phase difference between the phase of the output high-frequency voltage waveform of the first inverter and the phase of the output high-frequency voltage waveform of the second inverter is $\pi$, and the amplitude of the harmonic current in the alternating current output by the second inverter is relatively large. For a specific current curve, refer to FIG. 5. It can be learned from a current curve of an alternating current $i_{g1}$ output by the first inverter and an alternating current $i_{g2}$ output by the second inverter shown in FIG. 5 that a high frequency component (which may be used to represent an amplitude of a harmonic current) in $i_{g1}$ and $i_{g2}$ is relatively large.

Figure 6:
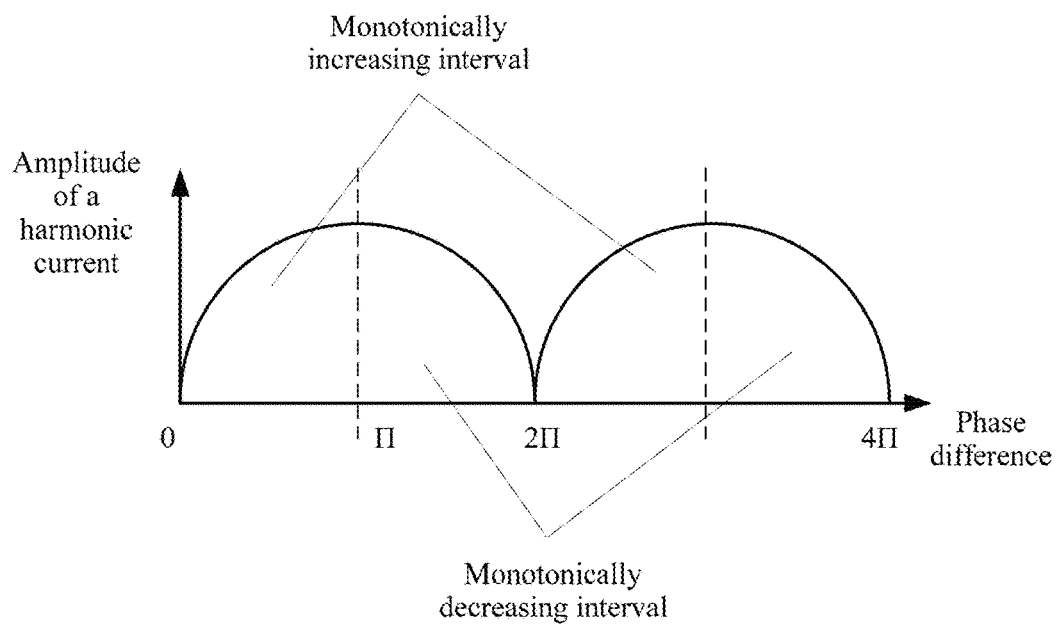
FIG. 6 is a schematic diagram of a relationship between a phase difference $\Delta\theta$ of an input carrier and an amplitude if of a harmonic current according to an embodiment of this application.

It is found through an experiment that, a relationship between a phase difference $\Delta\theta$ of an input carrier and an amplitude if of a harmonic current is shown in FIG. 6. The following uses the input carrier corresponding to the first inverter and the input carrier corresponding to the second inverter as an example to describe the relationship between a phase difference of an input carrier and an amplitude of a harmonic current shown in FIG. 6.

It can be learned from a schematic diagram of the relationship between a phase difference $\Delta\theta$ of an input carrier and an amplitude $i_f$ of a harmonic current shown in FIG. 6 that a periodic local monotonic characteristic is presented between the phase difference $\Delta\theta$ of the input carrier and the amplitude $i_f$ of the harmonic current. The following uses an example in which a phase difference $\Delta\theta$ between the phase of the input carrier corresponding to the first inverter and the phase of the input carrier corresponding to the second inverter is between [0, 2$\pi$] for description. When the phase difference $\Delta\theta$ between the phase of the input carrier corresponding to the first inverter and the phase of the input carrier corresponding to the second inverter is between [0, $\pi$], the amplitude if of the harmonic current output by the second inverter increases as the phase difference $\Delta\theta$ increases; and when the phase difference $\Delta\theta$ between the phase of the input carrier corresponding to the first inverter and the phase of the input carrier corresponding to the second inverter is between [$\pi$, 2$\pi$], the amplitude of the harmonic current output by the second inverter decreases as the phase difference $\Delta\theta$ increases.

Therefore, in the method for synchronizing carriers in this embodiment of this application, based on the relationship between a phase difference $\Delta\theta$ of an input carrier and an amplitude if of a harmonic current shown in FIG. 6, the phase difference $\Delta\theta$ between the phase of the input carrier corresponding to the first inverter and the phase of the input carrier corresponding to the second inverter can be adjusted, to adjust the amplitude of the harmonic current.

Further, because the first inverter is an inverter that completes a carrier synchronization process with the power grid, the phase of the input carrier corresponding to the first inverter may be a fixed value $\theta^*$, and an adjustment to the phase difference $\Delta\theta$ between the phase of the input carrier corresponding to the first inverter and the phase of the input carrier corresponding to the second inverter to adjust the amplitude of the harmonic current output by the second inverter may be understood as an adjustment to the phase of the input carrier corresponding to the second inverter to adjust the amplitude of the harmonic current output by the second inverter.

Figure 7:
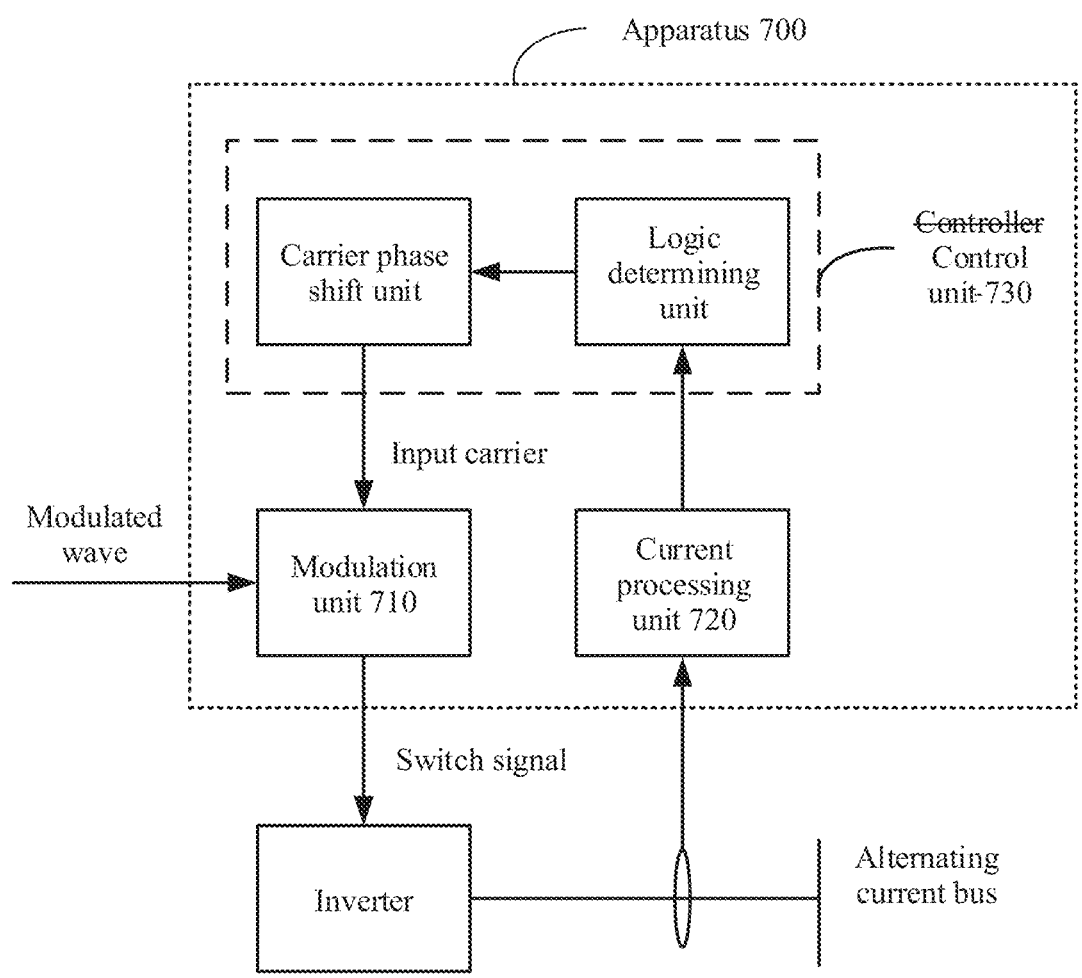
FIG. 7 is a schematic block diagram of an apparatus for synchronizing carriers according to an embodiment of this application.

With reference to FIG. 7, an apparatus for synchronizing carriers in an embodiment of this application is described in detail based on the schematic diagram of the relationship between a phase difference $\Delta\theta$ of an input carrier and an amplitude $i_f$ of a harmonic current shown in FIG. 6. For ease of understanding, an apparatus for synchronizing carriers shown in FIG. 7 may be understood as an apparatus for performing carrier synchronization on the second inverter shown in FIG. 2, namely, an apparatus for performing carrier synchronization on an inverter on which carrier synchronization is to be performed in a power supply system.

FIG. 7 is a schematic block diagram of an apparatus for synchronizing carriers according to an embodiment of this application. An apparatus 700 shown in FIG. 7 includes a modulation unit 710, a current processing unit 720, and a control unit 730.

The modulation unit is configured to generate a switch signal based on an input carrier and a modulated wave, to control a switch device in an inverter.

The current processing unit is configured to obtain an amplitude of a first harmonic current output by the inverter and an amplitude of a second harmonic current output by the inverter, where the first harmonic current is a harmonic current output by the inverter when the input carrier is input into the modulation unit as a first carrier and used with the modulated wave to generate a switch signal to control the switch device in the inverter, the second harmonic current is a harmonic current output by the inverter when the input carrier is input into the modulation unit as a second carrier and used with the modulated wave to generate a switch signal to control the switch device in the inverter, and a phase of the first carrier is different from a phase of the second carrier.

The control unit is configured to increase or decrease, based on a first change trend and a second change trend, a phase of an input carrier input into the modulation unit, so that an amplitude of a third harmonic current output by the inverter is less than a smaller value in the amplitude of the first harmonic current and the amplitude of the second harmonic current, where the first change trend is a change trend between the amplitude of the first harmonic current and the amplitude of the second harmonic current, the second change trend is a change trend between the phase of the first carrier and the phase of the second carrier, and the third harmonic current is a harmonic current output by the inverter when a carrier input into the modulation unit is an input carrier whose phase is adjusted and the input carrier whose phase is adjusted is used with the modulated wave to generate a switch signal to control the switch device in the inverter.

Specifically, the control unit can increase or decrease, based on the first change trend and the second change trend, the phase of the input carrier input into the modulation unit, to use the phase of the input carrier as a phase of a third carrier that is to be output by a controller. Therefore, when the input carrier is input into the modulation unit as the third carrier and used with the modulated wave to generate a switch signal to control the switch device in the inverter, the amplitude of the third harmonic current output by the inverter is less than the smaller value in the amplitude of the first harmonic current and the amplitude of the second harmonic current.

It should be noted that the input carrier input into the modulation unit includes three variables: an amplitude, a frequency, and a phase. The power supply system can set the frequency of the input carrier to a fixed value by using a clock in a control system, and synchronize amplitudes of input carriers through normalization processing. In this case, an only uncertain one of the three variables of the input carrier is an initial phase of the carrier. When a plurality of parallel inverters in the power supply system are not started synchronously, initial phases of carriers are different, and finally, phases of input carriers are not synchronous, in other words, the carriers are not synchronous. In other words, in this embodiment of this application, carrier synchronization may be understood as synchronization performed on phases of input carriers input into the modulation unit.

It should be further understood that the control unit may be a control unit for synchronizing carriers. When being disposed in the single-phase inverter 300, the apparatus 700 may be independent of the first control unit in the single-phase inverter, or may be integrated with the first control unit. This is not specifically limited in this embodiment of this application.

In this embodiment of this application, based on the change trend between the amplitude of the first harmonic current and the amplitude of the second harmonic current and the change trend between the phase of the first carrier and the phase of the second carrier, the phase of the input carrier input into the modulation unit is adjusted to serve as a phase of an input carrier that is to be output by a controller, to decrease an amplitude of a harmonic current output by the inverter and improve stability of a distributed power supply system.

Further, a prior-art problem that impact of a harmonic current on a power supply system cannot be reduced by synchronizing carriers in a process of synchronizing carriers based on a zero sequence current is avoided, thereby improving the stability of the distributed power supply system.

In some embodiments, the carrier and the modulated wave may be compared based on a pulse-width modulation (PWM) technology. When an amplitude of the modulated wave is greater than an amplitude of the carrier, a switch signal is at a high level; and when the amplitude of the modulated wave is less than the amplitude of the carrier, the switch signal is at a low level. Alternatively, when an amplitude of the modulated wave is greater than an amplitude of the carrier, a switch signal is at a low level; and when the amplitude of the modulated wave is less than the amplitude of the carrier, the switch signal is at a high level.

It should be further understood that the PWM technology may be implemented by using a comparator in a same manner as that in the prior art, or may be implemented by using a digital signal processor (DSP) chip. A specific implementation of the PWM technology is not limited in this embodiment of this application.

In some embodiments, the apparatus 700 may be a part of the inverter. For example, the apparatus 700 may be integrated into one chip with the inverter, and is specifically configured to perform carrier synchronization on the inverter. FIG. 3 is a schematic block diagram illustrating that a single-phase inverter and the apparatus 700 are integrated into one chip. The apparatus 700 may alternatively be an apparatus for synchronizing carriers that is located outside the inverter.

In some embodiments, the apparatus 700 may alternatively be a digital signal processor (DSP) built in the inverter.

Optionally, the control unit is further configured to: when the first change trend is the same as the second change trend, decrease the phase of the input carrier input into the modulation unit, and when the first change trend is contrary to the second change trend, increase the phase of the input carrier input into the modulation unit.

Specifically, that the first change trend is the same as the second change trend may mean that the second change trend increases as the first change trend increases or the second change trend decreases as the first change trend decreases. That the first change trend is contrary to the second change trend may mean that the second change trend decreases as the first change trend increases or the second change trend increases as the first change trend decreases.

In other words, that the first change trend is the same as the second change trend may mean that the first change trend and the second change trend fall within a monotonically increasing interval shown in FIG. 6, and that the first change trend is contrary to the second change trend may mean that the first change trend and the second change trend fall within a monotonically decreasing interval shown in FIG. 6.

In some implementations, the first change trend is denoted as $i_1-i_2$, where $i_1$ represents the amplitude of the first harmonic current, and $i_2$ represents an amplitude of a second harmonic current. The second change trend is denoted as $\theta_1-\theta_2$, where $\theta_1$ represents the phase of the first carrier, and $\theta_2$ represents the phase of the second carrier.

In some implementations, that the first change trend is the same as the second change trend may mean that the first change trend and the second change trend are both positive numbers or negative numbers, in other words, $$\frac{i_1-i_2}{\theta_1-\theta_2} > 0.$$

That the first change trend is contrary to the second change trend may mean that the first change trend and the second change trend are not both positive numbers or negative numbers, in other words, $$\frac{i_1-i_2}{\theta_1-\theta_2} < 0.$$

In some implementations, the control unit is further configured to: determine an adjustment step, where the adjustment step is an adjustment step of increasing or decreasing the phase of the input carrier; and increase or decrease, according to the adjustment step and based on the first change trend and the second change trend, the phase of the input carrier input into the modulation unit.

It should be understood that the adjustment step may be a fixed value, for example, the adjustment step may be a preset adjustment step. The adjustment step may alternatively be a variable value, for example, the adjustment step may be an adjustment step that changes with an amplitude of a harmonic current that is currently output by the inverter. A specific implementation form of the adjustment step is not limited in this embodiment of this application.

In some implementations, the first harmonic current is a harmonic current that is currently output by the inverter; and the control unit is further configured to determine the adjustment step according to a formula $$\Delta\theta = \begin{cases} \theta_{ref}, & (i_f \geq 20\% \cdot i_N) \\ 0.5 \cdot \theta_{ref}, & (i_N > i_f \geq 10\% \cdot i_N), \\ 0.25 \cdot \theta_{ref}, & (10\% \cdot i_N > i_f) \end{cases}$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

Specifically, that $\theta_{ref}$ represents the reference value for determining the adjustment step may mean that $\theta_{ref}$ represents a reference phase for determining the adjustment step.

It should be noted that $\theta_{ref}$ may be a preset reference value for determining the adjustment step.

In some implementations, the first harmonic current is a harmonic current that is currently output by the inverter; and the control unit is further configured to determine the adjustment step according to a formula $$\Delta\theta = \frac{i_f}{i_N} \theta_{ref},$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents an reference value for determining the adjustment step.

Specifically, that $\theta_{ref}$ represents the reference value for determining the adjustment step may mean that $\theta_{ref}$ represents a reference phase for determining the adjustment step.

It should be noted that $\theta_{ref}$ may be a preset reference value for determining the adjustment step.

In some embodiments, increasing the phase of the input carrier input into the modulation unit may mean delaying the input carrier for a time period corresponding to a time adjustment value in terms of time, and decreasing the phase of the input carrier input into the modulation unit may mean advancing the input carrier by a time period corresponding to a time adjustment value in terms of time.

In some embodiments, if a unit of the adjustment step $\Delta\theta$ is a degree, the time adjustment value $\Delta t$ may be obtained according to a formula $$\Delta t = \frac{\Delta\theta}{360° f_c},$$

where $\Delta\theta$ represents the adjustment step, and $f_c$ represents a frequency of an input carrier.

In some embodiments, if a unit of the adjustment step $\Delta\theta$ is a radian (rad), the time adjustment value $\Delta\theta$ may be obtained according to a formula $$\Delta t = \frac{\Delta\theta}{2\pi f_c},$$

where $\Delta\theta$ represents the adjustment step, and $f_c$ represents a frequency of an input carrier.

In some implementations, the control unit is further specifically configured to increase or decrease, based on the first change trend, the second change trend, a change trend of an amplitude of a harmonic current, and a change trend of the phase of the input carrier, the phase of the input carrier input into the modulation unit.

Specifically, the control unit may perform, based on the first change trend, the second change trend, and a mapping relationship between the change trend of the amplitude of the harmonic current, and the change trend of the phase of the input carrier, only one adjustment on the phase of the input carrier input into the modulation unit, so that the phase of the input carrier is synchronized with a phase of a carrier of another inverter (for example, a first inverter) on which carrier synchronization is performed in the power supply system.

In some implementations, the control unit is further specifically configured to increase or decrease, according to a preset adjustment step and based on the first change trend, the second change trend, and a mapping relationship between a change trend of an amplitude of a harmonic current, and a change trend of the phase of the input carrier, the phase of the input carrier input into the modulation unit.

Specifically, when the first change trend is the same as the second change trend, iteration is performed, according to the preset adjustment step, on the phase of the input carrier input into the modulation unit, to gradually decrease the phase of the input carrier input into the modulation unit until the amplitude of the third harmonic current output by the inverter is less than the smaller value in the amplitude of the first harmonic current and the amplitude of the second harmonic current; and when the first change trend is contrary to the second change trend, iteration is performed, according to the preset adjustment step, on the phase of the input carrier input into the modulation unit, to gradually increase the phase of the input carrier input into the modulation unit until the amplitude of the third harmonic current output by the inverter is less than the smaller value in the amplitude of the first harmonic current and the amplitude of the second harmonic current.

In some implementations, the control unit includes: a logic determining unit, configured to determine, based on the first change trend and the second change trend, the phase of the input carrier input into the modulation unit; and a phase shift unit, configured to increase or decrease, based on the determined phase of the input carrier input into the modulation unit, the phase of the input carrier input into the modulation unit.

In some implementations, the control unit is further configured to: when determining that the amplitude of the third harmonic current output by the inverter is less than a current amplitude threshold, stop increasing or decreasing the phase of the input carrier input into the modulation unit.

Specifically, when the amplitude of the third harmonic current output by the inverter is less than the current amplitude threshold, the control unit may stop adjusting the phase of the input carrier input into the modulation unit. In this case, it may be determined that the phase of the input carrier input into the modulation unit is synchronized with a phase of a carrier corresponding to another inverter (for example, the first inverter) on which carrier synchronization is performed in the power supply system different from the inverter.

In some implementations, the current amplitude threshold may be 1% of a rated current of the inverter.

In some implementations, the inverter is a single-phase inverter or a three-phase inverter.

Because the zero sequence current is a current generated when a phasor sum of three-phase currents in the three-phase inverter is not 0, and is a current only exists in the three-phase inverter, a method for synchronizing carriers based on the zero sequence current is inapplicable to the single-phase inverter. However, the harmonic current in this embodiment of this application is generated because there is a resonant point (namely, a point with relatively small impedance) in a hardware circuit of the inverter or there is system excitation (for example, a sideband signal) for a specific frequency in the power supply system, and is one of factors that affect stability of a power supply system including a plurality of parallel single-phase inverters, and therefore, a method for adjusting a harmonic current in this embodiment of this application is also applicable to the power supply system including the plurality of parallel single-phase inverters.

In some embodiments, the current processing unit is further configured to perform current sampling on an alternating current output by the inverter, to obtain an amplitude of a harmonic current output by the inverter.

Specifically, sampling is performed on the alternating current output by the inverter, and filtering processing is performed on the alternating current to obtain an amplitude of a harmonic current whose frequency is a first frequency. The first frequency is a resonance frequency of the inverter. In the inverter, other than an inductor and a capacitor included in a filter, a capacitor and an inductor on another component including a printed circuit board have very small inductance and capacitance (also referred to as parasitic inductance and capacitance) which may generally be ignored. Therefore, a resonance frequency of the capacitor and a resonance frequency of the inductor in the filter in the inverter may mainly be considered when the resonance frequency of the inverter is considered. In other words, the first frequency may be determined based on the resonance frequency of the capacitor and the resonance frequency of the inductor in the filter in the inverter.

If the first frequency may be denoted as f, the first frequency may be determined based on $$f = \frac{1}{2\pi\sqrt{L_{eq}C_{eq}}},$$

where $L_{eq}$ represents equivalent inductance of the filter, and $C_{eq}$ represents equivalent capacitance of the filter.

It should be understood that the filter for performing filtering processing on the alternating current to obtain the harmonic current with the first frequency may be a digital filter or an analog filter. The digital filter may perform filtering by using a fast Fourier transform method, and the analog filter may be specifically a band-pass filter.

In some embodiments, the embodiments of this application provide an inverter system. The inverter system includes several inverters, the inverter system includes the apparatus 700 shown in FIG. 7, and the apparatus 700 is configured to control the several inverters to synchronize carriers.

Specifically, the inverter system may include a plurality of inverters, and the apparatus 700 is configured to control a process of carrier synchronization between a target inverter connected to the apparatus 700 in the plurality of inverters and another inverter different from the target inverter in the inverter system.

It should be noted that FIG. 7 shows only one inverter in the inverter system in the embodiments of this application. A quantity of inverters in the inverter system is not specifically limited in the embodiments of this application.

It should be further understood that the apparatus 700 and the inverter may be encapsulated onto one circuit board. In other words, each inverter in the inverter system has an independent apparatus 700. For a specific manner of connecting the apparatus 700 and the inverter, refer to FIG. 7.

The apparatus for synchronizing carriers in the embodiments of this application is described above in detail with reference to FIG. 1 to FIG. 7. The following describes in detail, with reference to FIG. 8, a method for synchronizing carriers according to an embodiment of this application. It should be understood that the apparatus shown in FIG. 7 can implement steps in the method shown in FIG. 8. To avoid repetition, details are not described herein.

FIG. 8 is a schematic flowchart of a method for synchronizing carriers according to an embodiment of this application. An apparatus to which the method is applied includes a modulation unit and an inverter, the modulation unit is configured to generate a switch signal based on an input carrier and a modulated wave, to control a switch device in the inverter, and the method includes:

810. Obtain an amplitude of a first harmonic current output by the inverter and an amplitude of a second harmonic current output by the inverter, where the first harmonic current is a harmonic current output by the inverter when the input carrier is input into the modulation unit as a first carrier and used with the modulated wave to generate a switch signal to control the switch device in the inverter, the second harmonic current is a harmonic current output by the inverter when the input carrier is input into the modulation unit as a second carrier and used with the modulated wave to generate a switch signal to control the switch device in the inverter, and a phase of the first carrier is different from a phase of the second carrier.

In some implementations, the inverter is a single-phase inverter or a three-phase inverter.

820. Increase or decrease, based on a first change trend and a second change trend, a phase of an input carrier input into the modulation unit, so that an amplitude of a third harmonic current output by the inverter is less than a smaller value in the amplitude of the first harmonic current and the amplitude of the second harmonic current, where the first change trend is a change trend between the amplitude of the first harmonic current and the amplitude of the second harmonic current, the second change trend is a change trend between the phase of the first carrier and the phase of the second carrier, and the third harmonic current is a harmonic current output by the inverter when a carrier input into the modulation unit is an input carrier whose phase is increased or decreased and the input carrier whose phase is increased or decreased is used with the modulated wave to generate a switch signal to control the switch device in the inverter.

It should be understood that FIG. 8 shows detailed steps or operations for synchronizing carriers, but these steps or operations are merely examples. Another operation or transformation of the operations in FIG. 8 may be performed in this embodiment of this application. In addition, the steps in FIG. 8 may be performed in an order different from that shown in FIG. 8, and not all the operations in FIG. 8 may be performed. The following describes in detail the steps in the method shown in FIG. 8.

In this embodiment of this application, based on the change trend between the amplitude of the first harmonic current and the amplitude of the second harmonic current and the change trend between the phase of the first carrier and the phase of the second carrier, the phase of the input carrier input into the modulation unit is adjusted, to decrease an amplitude of a harmonic current output by the inverter and improve stability of a distributed power supply system.

Further, a prior-art problem that impact of a harmonic current on a power supply system cannot be reduced by synchronizing carriers in a process of synchronizing carriers based on a zero sequence current is avoided, thereby improving the stability of the distributed power supply system.

In some implementations, step 820 further includes: when the first change trend is the same as the second change trend, decreasing the phase of the input carrier input into the modulation unit, and when the first change trend is contrary to the second change trend, increasing the phase of the input carrier input into the modulation unit.

In some implementations, the first change trend is denoted as $i_1-i_2$, $i_1$ represents the amplitude of the first harmonic current, and $i_2$ represents an amplitude of a second harmonic current. The second change trend is denoted as $\theta_1-\theta_2$, where $\theta_1$ represents the phase of the first carrier, and $\theta_2$ represents the phase of the second carrier.

In some implementations, that the first change trend is the same as the second change trend may mean that the first change trend and the second change trend are both positive numbers or negative numbers, in other words, $$\frac{i_1 - i_2}{\theta_1 - \theta_2} > 0.$$

That the first change trend is contrary to the second change trend may mean that the first change trend and the second change trend are not both positive numbers or negative numbers, in other words, $$\frac{i_1 - i_2}{\theta_1 - \theta_2} < 0.$$

In some implementations, step 820 further includes: determining an adjustment step, where the adjustment step is an adjustment step of increasing or decreasing the phase of the input carrier; and increasing or decreasing, according to the adjustment step and based on the first change trend and the second change trend, the phase of the input carrier input into the modulation unit.

In some implementations, the first harmonic current is a harmonic current that is currently output by the inverter; and the control unit is further configured to determine the adjustment step according to a formula $$\Delta\theta = \begin{cases} \theta_{ref}, & (i_f \geq 20\% \cdot i_N) \\ 0.5 \cdot \theta_{ref}, & (i_N > i_f \geq 10\% \cdot i_N), \\ 0.25 \cdot \theta_{ref}, & (10\% \cdot i_N > i_f) \end{cases}$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

In some implementations, the first harmonic current is a harmonic current that is currently output by the inverter; and the control unit is further configured to determine the adjustment step according to a formula $$\Delta\theta = \frac{i_f}{i_N} \theta_{ref},$$

where $\theta_{ref} > 0$, $\Delta\theta$ represents the adjustment step, $i_f$ represents the amplitude of the first harmonic current, $i_N$ represents a rated current value of the inverter, and $\theta_{ref}$ represents an reference value for determining the adjustment step.

In some embodiments, increasing the phase of the input carrier input into the modulation unit may mean delaying the input carrier for a time period corresponding to a time adjustment value in terms of time, and decreasing the phase of the input carrier input into the modulation unit may mean advancing the input carrier by a time period corresponding to a time adjustment value in terms of time.

In some embodiments, if a unit of the adjustment step $\Delta\theta$ is a degree, a time adjustment value $\Delta t$ may be obtained according to a formula $$\Delta t = \frac{\Delta\theta}{360° f_c},$$

where $\Delta\theta$ represents the adjustment step, and $f_c$ represents a frequency of an input carrier.

In some embodiments, if a unit of the adjustment step $\Delta\theta$ is a radian (rad), a time adjustment value $\Delta t$ may be obtained according to a formula $$\Delta t = \frac{\Delta\theta}{2\pi f_c}$$

where $\Delta\theta$ represents the adjustment step, and $f_c$ represents a frequency of an input carrier.

In some implementations, step 820 further includes: increasing or decreasing, based on the first change trend, the second change trend, and a mapping relationship between a change trend of an amplitude of a harmonic current, and a change trend of the phase of the input carrier, the phase of the input carrier input into the modulation unit.

Specifically, one adjustment is performed, based on the first change trend, the second change trend, and a mapping relationship between the first change trend and the second change trend, on the phase of the input carrier input into the modulation unit, so that the phase of the input carrier is synchronized with a phase of a carrier of another inverter (for example, a first inverter) on which carrier synchronization is performed in the power supply system.

In some implementations, step 820 further includes: increasing or decreasing, according to a preset adjustment step and based on the first change trend, the second change trend, and a mapping relationship between a change trend of an amplitude of a harmonic current, and a change trend of the phase of the input carrier, the phase of the input carrier input into the modulation unit.

In some implementations, step 820 further includes: determining, based on the first change trend and the second change trend, the phase of the input carrier input into the modulation unit; and increasing or decreasing, based on the determined phase of the input carrier input into the modulation unit, the phase of the input carrier input into the modulation unit.

In some implementations, the method further includes: when determining that the amplitude of the third harmonic current output by the inverter is less than a current amplitude threshold, stopping increasing or decreasing the phase of the input carrier input into the modulation unit.

With reference to a carrier synchronization control period, the following describes in detail the method for synchronizing carriers in this embodiment of this application. For ease of description, an "input carrier corresponding to a second inverter" described below may be an input carrier used with a modulated wave in a modulation unit to generate a switch signal, to control a switch device in the second inverter.

Figure 9:
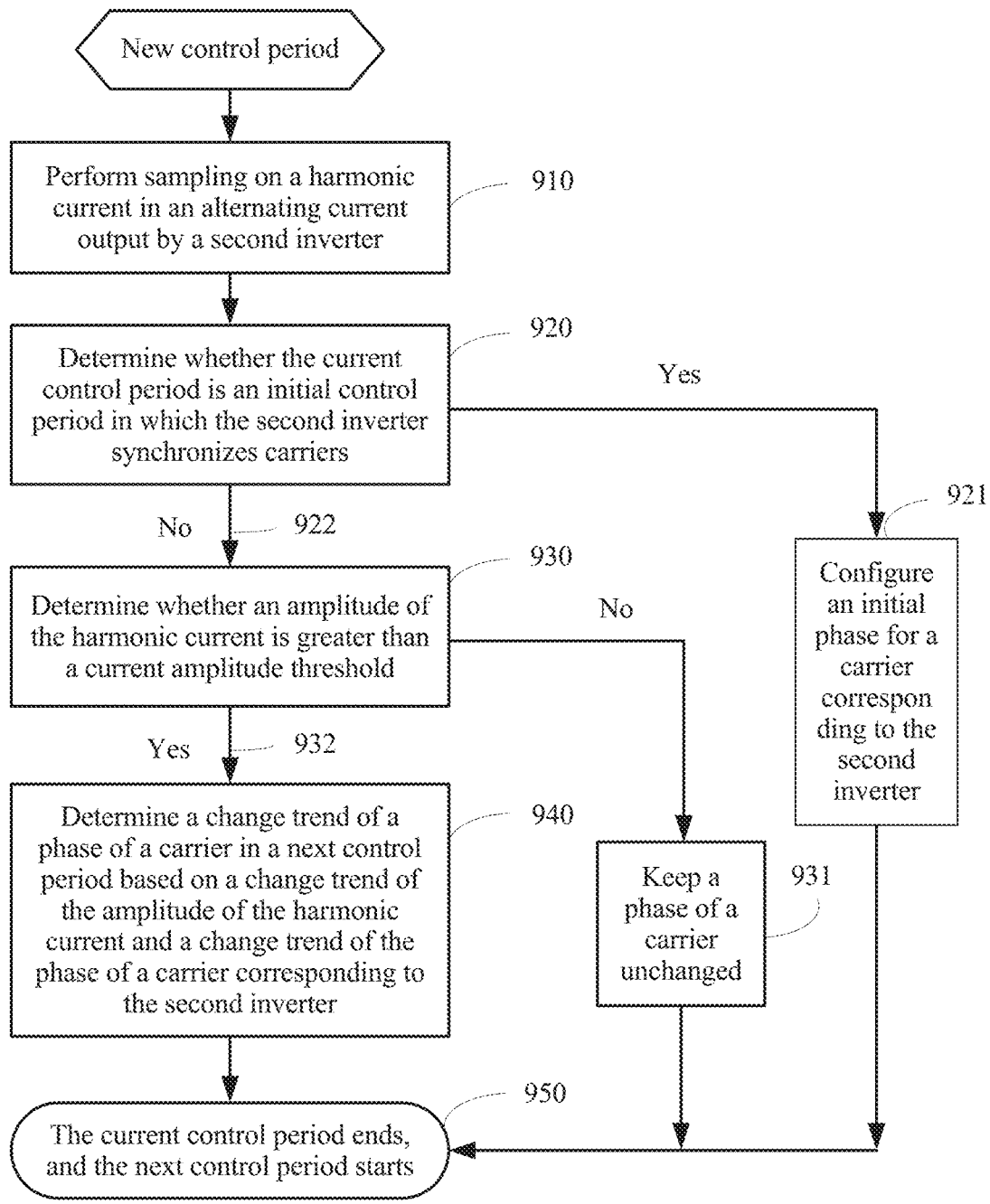
FIG. 9 is a schematic flowchart of a method for synchronizing carriers according to an embodiment of this application.

FIG. 9 is a schematic flowchart of a method for synchronizing carriers according to an embodiment of this application. It should be understood that the method shown in FIG. 9 is based on the distributed power supply system shown in FIG. 2. A first inverter may be an inverter on which carrier synchronization is performed, and a second inverter may be an inverter on which carrier synchronization needs to be performed. The method shown in FIG. 9 includes the following steps.

910. Perform sampling on a harmonic current in an alternating current output by the second inverter.

Specifically, a frequency of the harmonic current may be determined based on $$f = \frac{1}{2\pi\sqrt{L_{eq}C_{eq}}},$$

where $L_{eq}$ represents equivalent inductance of a filter, and $C_{eq}$ represents equivalent capacitance of the filter.

920. Determine whether a current control period is an initial control period in which the second inverter synchronizes carriers.

Specifically, there may be the following two cases of determining whether the current control period is the initial control period in which the second inverter synchronizes carriers.

921. If the current control period is the initial control period in which the second inverter synchronizes carriers, mark, as $\theta_0$, a phase of an input carrier corresponding to the second inverter in the current control period, configure a preset initial phase $\theta_1$ for an input carrier corresponding to the second inverter in a next control period, and then perform step 950.

It should be noted that, in the initial control period, the phase $\theta_0$ of the input carrier corresponding to the inverter may be randomly selected or may be a previously configured fixed value. A specific selection manner of the initial phase is not limited in this embodiment of this application.

In the next control period following the initial control period, the phase $\theta_1$ of the input carrier corresponding to the inverter may be randomly selected or may be a previously configured fixed value. A specific selection manner of the initial phase is not limited in this embodiment of this application.

922. If the current control period is not the initial control period in which the second inverter synchronizes carriers, perform step 930.

It should be noted that the control period may include at least one switch period.

930. Determine whether an amplitude of the harmonic current is greater than a current amplitude threshold.

Specifically, there are the following two cases of determining whether the amplitude of the harmonic current is greater than the current amplitude threshold.

931. If the amplitude of the harmonic current is less than or equal to the current amplitude threshold, it may be determined that the phase of the carrier currently corresponding to the second inverter is approximately synchronized with a phase of a carrier in a power supply system, stop adjusting the phase of the carrier corresponding to the second inverter, and perform step 950.

932. If the amplitude of the harmonic current is greater than the current amplitude threshold, perform step 940.

Because the amplitude of the harmonic current is greater than the current amplitude threshold, it may be determined that the current harmonic current may still affect stability of the system. Therefore, the amplitude of the harmonic current needs to be adjusted, and step 940 is performed.

940. Determine, based on a change trend of the amplitude of the harmonic current and a change trend of the phase of the input carrier corresponding to the second inverter, a change trend of a phase of the input carrier corresponding to the second inverter in the next control period.

Specifically, for ease of description, a symbol is used for description. The current control period is an $n^{th}$ control period, and a control period before the current control period is denoted as (n−1). By analogy, a control period before the $(n-1)^{th}$ control period is denoted as (n−2), and a control period following the current control period may be denoted as (n+1). An amplitude of a harmonic current output by the inverter in the $n^{th}$ control period is $i_n$, an amplitude of a harmonic current output by the inverter in the $(n-1)^{th}$ control period is $i_{n-1}$, and a phase of an input carrier corresponding to the second inverter in the control period is $\theta_{n-1}$. An amplitude of a harmonic current output by the inverter in the $(n-2)^{th}$ control period is $i_{n-2}$, and a phase of an input carrier corresponding to the second inverter in the control period is $\theta_{n-2}$. The change trend of the amplitude of the harmonic current may be denoted as $i_n - i_{n-1}$, and the change trend of the phase of the carrier may be denoted as $\theta_n - \theta_{n-1}$. In other words, a change trend between a phase $\theta_{n+1}$ of an input carrier corresponding to the second inverter in the $(n+1)^{th}$ control period and a phase $\theta_n$ of an input carrier corresponding to the second inverter in the $n^{th}$ control period may be determined based on $i_n - i_{n-1}$ and $\theta_n - \theta_{n-1}$.

There may be specifically the following two cases of determining the phase of the carrier in the $(n+1)^{th}$ control period.

Figure 5:
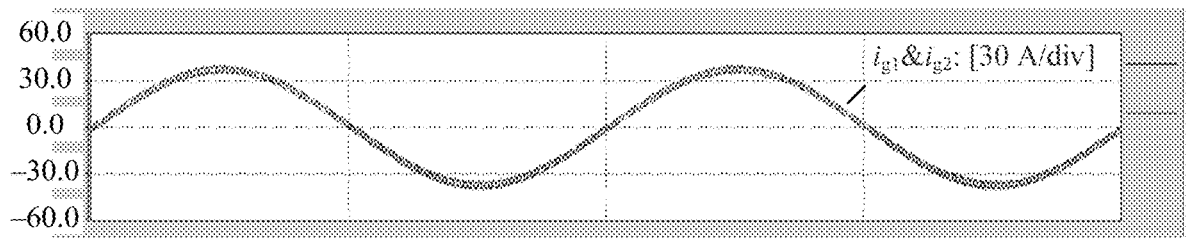
FIG. 5 is a schematic diagram of an output current curve of a first inverter and a second inverter in a power supply system according to an embodiment of this application.

1. When the change trend of $i_n - i_{n-1}$ is the same as the change trend of $\theta_n - \theta_{n-1}$, in other words, $$\frac{i_n - i_{n-1}}{\theta_n - \theta_{n-1}} > 0,$$

it may be determined that $i_n-i_{n+1}$ and $\theta_n-\theta_{n-1}$ are in a monotonically increasing interval in the curve shown in FIG. 5, and in this case, the change trend between the phase of the carrier in the $(n+1)^{th}$ control period and the phase of the carrier in the $n^{th}$ control period may be a decreasing trend, in other words, $\theta_{n+1}<\theta_n$.

2. When the change trend of $i_n-i_{n-1}$ is contrary to the change trend of $\theta_n-\theta_{n-1}$, in other words, $$\frac{i_n - i_{n-1}}{\theta_n - \theta_{n-1}} < 0,$$

it may be determined that $i_n-i_{n-1}$ and $\theta_n-\theta_{n-1}$ are in a monotonically decreasing interval in the curve shown in FIG. 5, and in this case, the change trend between the phase of the carrier in the $(n+1)^{th}$ control period and the phase of the carrier in the $n^{th}$ control period may be an increasing trend, in other words, $\theta_{n+1}>\theta_n$.

950. The current control period ends, and the next control period starts.

Specifically, the adjustment of the phase of the input carrier in the $n^{th}$ control period ends, and the $(n+1)^{th}$ control period starts.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid state disk SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for synchronizing carriers, comprising:
  a modulation circuit, configured to:
    generate a first switch signal based on a first input carrier and a modulated wave to control a switch device in an inverter;
    generate a second switch signal based on a second input carrier and the modulated wave to control the switch device in the inverter; and
    generate a third switch signal based on a third input carrier and the modulated wave to control the switch device in the inverter;
  a current processing circuit, configured to:
    obtain an amplitude of a first harmonic current output by the inverter and an amplitude of a second harmonic current output by the inverter,
    wherein the first harmonic current is a harmonic current output by the inverter when the first input carrier is input into the modulation circuit and used with the modulated wave to generate the first switch signal to control the switch device in the inverter,
    wherein the second harmonic current is a harmonic current output by the inverter when the second input carrier is input into the modulation circuit and used with the modulated wave to generate the second switch signal to control the inverter, and wherein a phase of the first input carrier is different from a phase of the second input carrier; and a control circuit, configured to:
increase or decrease, based on a first change trend and a second change trend, a phase of the third input carrier input into the modulation circuit, so that an amplitude of a third harmonic current output by the inverter is less than a smaller one of the amplitude of the first harmonic current and the amplitude of the second harmonic current, wherein the first change trend is a change trend indicating a change from the amplitude of the first harmonic current to the amplitude of the second harmonic current, wherein the second change trend is a change trend indicating a change from the phase of the first input carrier to the phase of the second input carrier, and wherein the third harmonic current is a harmonic current output by the inverter when the third input carrier input into the modulation circuit is an input carrier whose phase is adjusted and the third input carrier whose phase is adjusted is used with the modulated wave to generate the third switch signal to control the switch device in the inverter.

2. The apparatus according to claim 1, wherein the control circuit is configured to:
when the first change trend and the second change trend both increase or decrease, decrease the phase of the third input carrier input into the modulation circuit, and
when the first change trend increases and the second change trend decreases, or when the first change trend decreases and the second change trend increases, increase the phase of the third input carrier input into the modulation circuit.

3. The apparatus according to claim 1, wherein the control circuit is further configured to:
determine an adjustment step, wherein the adjustment step is an adjustment step of increasing or decreasing the phase of the third input carrier; and
increase or decrease, according to the adjustment step and based on the first change trend and the second change trend, the phase of the third input carrier input into the modulation circuit.

4. The apparatus according to claim 3, wherein when the first harmonic current is currently output by the inverter, the control circuit is further configured to:
determine the adjustment step according to a formula $$\Delta\theta = \begin{cases} \theta_{ref}, (i_f \geq 20\% \cdot i_N) \\ 0.5 \cdot \theta_{ref}, (i_N > i_f \geq 10\% \cdot i_N), \\ 0.25 \cdot \theta_{ref}, (10\% \cdot i_N > i_f) \end{cases}$$

wherein $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

5. The apparatus according to claim 3, wherein when the first harmonic current is currently output by the inverter, the control circuit is further configured to:
determine the adjustment step according to a formula $$\Delta\theta = \frac{i_f}{i_N}\theta_{ref},$$

wherein $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

6. The apparatus according to claim 1, wherein the control circuit is further configured to:
increase or decrease, based on the first change trend, the second change trend, and a mapping relationship between the first change trend and the second change trend in predetermined phase intervals, the phase of the third input carrier input into the modulation circuit.

7. The apparatus according to claim 1, wherein the control circuit comprises:
a logic determining unit, configured to determine, based on the first change trend and the second change trend, the phase of the third input carrier input into the modulation circuit; and
a phase shift unit, configured to increase or decrease, based on the determined phase of the third input carrier input into the modulation circuit, the phase of the third input carrier input into the modulation circuit.

8. A method comprises:
obtaining an amplitude of a first harmonic current output by an inverter and an amplitude of a second harmonic current output by the inverter, wherein the first harmonic current is a harmonic current output by the inverter when a first input carrier is input into a modulation circuit and used with a modulated wave to generate a first switch signal to control a switch device in the inverter, wherein the second harmonic current is a harmonic current output by the inverter when a second input carrier is input into the modulation circuit and used with the modulated wave to generate a second switch signal to control the inverter, and wherein a phase of the first input carrier is different from a phase of the second input carrier; and
increasing or decreasing, based on a first change trend and a second change trend, a phase of a third input carrier input into the modulation circuit, so that an amplitude of a third harmonic current output by the inverter is less than a smaller one of the amplitude of the first harmonic current and the amplitude of the second harmonic current, wherein the first change trend is a change trend indicating a change from the amplitude of the first harmonic current to the amplitude of the second harmonic current, wherein the second change trend is a change trend indicating a change from the phase of the first input carrier to the phase of the second input carrier, and wherein the third harmonic current is a harmonic current output by the inverter when the third input carrier input into the modulation circuit is an input carrier whose phase is increased or decreased and the third input carrier whose phase is increased or decreased is used with the modulated wave to generate a third switch signal to control the switch device in the inverter.

9. The method according to claim 8, wherein the increasing or decreasing, based on a first change trend and a second change trend, a phase of a third input carrier input into the modulation circuit comprises:
when the first change trend and the second change trend both increase or decrease, decreasing the phase of the third input carrier input into the modulation circuit, and
when the first change trend increases and the second change trend decreases, or when the first change trend decreases and the second change trend increases, increasing the phase of the third input carrier input into the modulation circuit.

10. The method according to claim 8, wherein the method further comprises:
   determining an adjustment step, wherein the adjustment step is an adjustment step of increasing or decreasing the phase of the third input carrier; and
   the increasing or decreasing, based on a first change trend and a second change trend, a phase of a third input carrier input into the modulation circuit further comprises:
   increasing or decreasing, according to the adjustment step and based on the first change trend and the second change trend, the phase of the third input carrier input into the modulation circuit.

11. The method according to claim 10, wherein when the first harmonic current is currently output by the inverter, the determining an adjustment step comprises:
   determining the adjustment step according to a formula $$\Delta\theta = \begin{cases} \theta_{ref}, & (i_f \geq 20\% \cdot i_N) \\ 0.5 \cdot \theta_{ref}, & (i_N > i_f \geq 10\% \cdot i_N), \\ 0.25 \cdot \theta_{ref}, & (10\% \cdot i_N > i_f) \end{cases}$$

wherein $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

12. The method according to claim 10, wherein when the first harmonic current is currently output by the inverter, the determining an adjustment step comprises:
   determining the adjustment step according to a formula $$\Delta\theta = \frac{i_f}{i_N}\theta_{ref},$$

wherein $\theta_{ref} > 0$, $\Delta\theta$ represents the adjustment step, $i_f$ represents the amplitude of the first harmonic current, $i_N$ represents a rated current value of the inverter, and $\theta_{ref}$ represents a reference value for determining the adjustment step.

13. The method according to claim 8, wherein the increasing or decreasing, based on a first change trend and a second change trend, a phase of a third input carrier input into the modulation circuit further comprises:
   increasing or decreasing, based on the first change trend, the second change trend, and a mapping relationship between the first change trend and the second change trend in predetermined phase intervals, the phase of the third input carrier input into the modulation circuit.

14. The method according to claim 8, wherein the increasing or decreasing, based on a first change trend and a second change trend, a phase of a third input carrier input into the modulation circuit comprises:
   determining, based on the first change trend and the second change trend, the phase of the third input carrier input into the modulation circuit; and
   increasing or decreasing, based on the determined phase of the third input carrier input into the modulation circuit, the phase of the third input carrier input into the modulation circuit.

* * * * *